United States Patent [19]
Murphy et al.

[11] Patent Number: 5,448,673
[45] Date of Patent: Sep. 5, 1995

[54] CONTROLLED DOPANT DIFFUSION FOR FIBER OPTIC COUPLER

[75] Inventors: Kent A. Murphy, Troutville; Michael F. Gunther, Blacksburg; Angela J. Plante, Blacksburg; Veerendra B. Vuppala, Blacksburg; Mallika B. Sen, Blacksburg; Nirmal Velayudhan, Blacksburg; Richard O. Claus, Blacksburg, all of Va.

[73] Assignee: Center for Innovative Technology, Herndon, Va.

[21] Appl. No.: 106,274

[22] Filed: Aug. 12, 1993

[51] Int. Cl.⁶ ............................................. G02B 6/10
[52] U.S. Cl. ................................. 385/123; 385/96; 385/43; 65/410
[58] Field of Search ............... 385/123, 42–46, 385/95–98; 65/410, 411

[56] References Cited

U.S. PATENT DOCUMENTS

| | | | |
|---|---|---|---|
| 4,330,170 | 5/1982 | Johnson et al. | 385/46 X |
| 4,431,264 | 2/1984 | Clarke | 385/123 |
| 4,755,037 | 7/1988 | Bjornlie et al. | 385/43 |
| 4,895,423 | 1/1990 | Bilodeau et al. | 385/96 |
| 5,069,518 | 12/1991 | Sasaki | 385/43 |
| 5,171,345 | 12/1992 | Takemura | 385/96 |

*Primary Examiner*—Rodney B. Bovernick
*Assistant Examiner*—Phan Thi Heartney Palmer
*Attorney, Agent, or Firm*—Whitham, Curtis, Whitham & McGinn

[57] ABSTRACT

Uniformity of optical coupling of optical elements such as star couplers and splitters is improved by heat treatment which causes dopants in the core of an optical fiber to diffuse into material from the cladding layer of the optical fibers from which the optical element is formed, resulting in a substantially homogeneous interior region of the star coupler or splitter. Increased lossiness of the optical element thus formed may be limited by termination of the heat treatment before dopant diffusion reaches equilibrium throughout the fibers so that a portion of the cladding layer of the fibers remains surrounding the substantially homogeneous region where the fibers have been fused together.

7 Claims, 4 Drawing Sheets

|  | Time | | |
|---|---|---|---|
| Output Ports | 0 sec | 325 sec | 405 sec |
| 9 | −8.7 | −9.4 | −9.9 |
| 10 | −11.1 | −10.8 | −11.2 |
| 11 | −10.6 | −10.2 | −10.7 |
| 12 | −10.9 | −10.6 | −11 |
| 13 | −10.6 | −10.4 | −10.8 |
| 14 | −10.6 | −10.4 | −10.7 |
| 15 | −10.8 | −10.5 | −11 |
| 16 | −11.1 | −10.7 | −11.1 |
| Uniformity | −2.4 | −1.3 | −1.2 |

All values in dB

FIG.5

All values in dB

| | Input Ports | | | | | | | |
|---|---|---|---|---|---|---|---|---|
| Output Ports | 1 | 2 | 3 | 4 | 5 | 6 | 7 | 8 |
| 9 | −8.7 | −9.7 | −10.5 | −10.1 | −10.3 | −10.4 | −10.3 | −9.9 |
| 10 | −11.1 | −7.8 | −11.1 | −10.9 | −11.0 | −11.0 | −11.0 | −10.6 |
| 11 | −10.6 | −9.8 | −8.2 | −10.2 | −10.5 | −10.4 | −10.4 | −10.0 |
| 12 | −10.9 | −10.1 | −10.8 | −8.4 | −10.7 | −10.6 | −10.6 | −10.3 |
| 13 | −10.6 | −9.9 | −10.8 | −10.3 | −8.1 | −10.6 | −10.5 | −10.0 |
| 14 | −10.6 | −9.8 | −10.6 | −10.2 | −10.4 | −8.6 | −10.4 | −10.0 |
| 15 | −10.8 | −10.0 | −10.9 | −10.4 | −10.7 | −10.7 | −8.3 | −10.2 |
| 16 | −11.1 | −10.3 | −11.1 | −10.7 | −10.8 | −11.0 | −10.8 | −8.0 |

FIG.6

All values in dB

| | Input Ports | | | | | | | |
|---|---|---|---|---|---|---|---|---|
| Output Ports | 1 | 2 | 3 | 4 | 5 | 6 | 7 | 8 |
| 9 | −9.9 | −9.7 | −10.5 | −10.2 | −10.1 | −10.5 | −10.3 | −9.9 |
| 10 | −11.2 | −9.9 | −10.9 | −10.8 | −10.6 | −10.6 | −10.9 | −10.5 |
| 11 | −10.7 | −9.7 | −10.1 | −10.2 | −10.1 | −10.3 | −10.4 | −10.0 |
| 12 | −11.0 | −10.0 | −10.7 | −10.1 | −10.4 | −10.7 | −10.6 | −10.2 |
| 13 | −10.8 | −9.8 | −10.7 | −10.4 | −9.6 | −10.6 | −10.6 | −10.1 |
| 14 | −10.7 | −9.5 | −10.4 | −10.3 | −10.1 | −10.0 | −10.4 | −10.0 |
| 15 | −11.0 | −10.1 | −10.9 | −10.6 | −10.5 | −10.9 | −9.7 | −10.3 |
| 16 | −11.1 | −10.3 | −11.0 | −10.8 | −10.6 | −11.0 | −10.9 | −9.4 |

CONTROLLED DOPANT DIFFUSION FOR FIBER OPTIC COUPLER

BACKGROUND OF THE INVENTION

1. Field of the Invention

The present invention generally relates to signalling over fiber optic communication links and, more particularly, to devices for coupling a signal from one optical fiber to one or more other optical fibers and techniques for fabricating the same.

2. Description of the Prior Art

Conduction and guidance of light through the use of optical fibers is currently well-known and structures for optical fibers capable of conducting light over substantial distances with little light loss are relatively well-developed. More recently, the light guiding and conducting properties of optical fibers have been used as an alternative medium for signal communications where signals were traditionally conducted by electrical signalling.

As compared with signalling over wired circuits or wireless links such as radio or microwave communications, fiber optical communication links offer several distinct advantages. For example, communication using modulated light over fiber optics, while potentially subject to interference from stray light, is, in general, much more easily protected from environmental noise. In contrast, shielding electrical communication links from inductively or capacitively coupled noise may be extremely difficult compared to the inherent rejection of ambient optical noise by fibers of the total internal reflection (TIR) type now in widespread use.

Further, while neither light conducting fibers nor electrically conductive wiring are ideal conductors of their respective media, an ideal conductor of light can be much more closely approached with optical fibers of relatively common materials. For example, glass fibers having layers of different refractive indices, can yield a close approach to total internal reflection while losses associated with an electrical conductor may be significant, even when using relatively rare materials such as gold for the conductor.

However, some difficulties are encountered in optical communication links, particularly as such links become longer and more complex. These difficulties may be readily appreciated by recognizing that any optical boundary or junction, including geometrical variation represent imperfections in transmissivity which are relatively large in comparison with their electrical counterparts and particularly in comparison with the performance of uninterrupted optical fibers. For example, a splice from one length of optical fiber to another implies at least two boundaries, each of which will necessarily be partially transmissive and partially reflective due to differences in refractive indices at these boundaries. Various solutions to the imperfections necessarily caused by such commonly required practical fittings have, in many instances yielded substantial success.

For example, gels or oils having indices of refraction matched to optical fiber materials, together with relatively simple grooved alignment devices yield adequate transmissive splices. Splices may also be done by fusing the ends of optical fibers to remove the boundaries. However, some geometrical error or variation is substantially unavoidable and will cause some signal loss, reflection or attenuation, just as different layers of cladding having differing refractive indices cannot be fully matched by the gels or oils referred to above. Nevertheless, such techniques have yielded a variety of devices which meet most common needs and are entirely adequate for such purposes at the present state of the art in optical communications.

Some types of devices exhibit problems which are substantially less tractable. For example, as communication systems and instrumentation has become more complex, so-called splitters and star couplers are needed to couple an optical signal in one fiber to one or more other fibers. The comparable electrical function is readily accomplished by providing a low output impedance and current drive capability of a circuit providing input to a plurality of circuits having high input impedance. The quantification of the number of electrical circuits to which a signal in another circuit can be coupled is commonly referred to as fan-out.

However, in optical systems, such coupling requires some lateral component of light transmission (since coaxial coupling from one fiber to more than one fiber is topologically impossible) which the usual structure of optical fibers is designed to prevent. Therefore, the geometry of choice has become the so-called fused biconical taper (FBT) star coupler which provides several modifications of fiber geometry which allows coupling to occur.

An FBT star coupler, in its simplest form, typically comprises a plurality or bundle of fibers in which a relatively short length of the bundle is fused together and reduced in cross-section, thus taking on the form of two cones joined at the respective apices thereof which is the basis of the name. The formation of such a structure is typically performed at the present state of the art by a highly trained technician using sophisticated optical equipment. Commonly, while monitoring the process by injecting light into one (usually central) fiber or several fibers and monitoring the light output of other fibers, the bundle of fibers is heated to about 1700° C. to cause fusing (but not viscous flow) of the fibers. The heated portion of the bundle is then stretched to reduce the diameter of the bundle and each fiber therein and twisted to cause compression between the fibers to thus form the biconical portion of the star coupler. At some point in this process, the coupling from one fiber to another will come within predetermined coupling specifications and the process is terminated.

Star couplers made in this fashion exhibit substantial differential variations in coupling efficiency to respective output fibers. Therefore, sophisticated and delicate correction techniques have been developed in order to effect partial correction of consistency of coupling efficiencies of star couplers in a post-production process to reclaim portions of manufacturing yield which would otherwise be lost. For example, one such technique involves breaking the star coupler between the conical sections, rotating one section by 180° and rejoining the sections to cause averaging of differences in coupling efficiency.

In summary, star couplers must be made by an essentially manual process by skilled personnel and, at the present level of skill in the art, are not susceptible of automated manufacture since the sufficiency of coupler formation must be monitored during the manufacturing process. Even with highly skilled personnel, manufacturing yield is relatively low and post-production correction is delicate, slow and also requires highly trained personnel.

SUMMARY OF THE INVENTION

It is therefore an object of the present invention to provide a method of manufacture of fused biconical tapered optical couplers which increases manufacturing yields.

It is another object of the invention to provide a fused biconical tapered coupler of improve uniformity and method for manufacture thereof.

It is a further object of the invention to provide a technique of formation of fused biconical tapered optical couplers which may be automated while retaining good manufacturing yields, It is yet another object of the invention to provide a fused biconical tapered coupler exhibiting reduced need for post-production correction of coupling uniformity.

In order to accomplish these and other objects of the invention, a method is provided including the steps of heating a region of an optical element to a temperature at which a dopant will diffuse from a core region into a cladding region, and maintaining that temperature until at least a region between at least two optical fibers becomes substantially homogeneous.

In accordance with another aspect of the invention, an optical element is provided, formed of at least two optical fibers which are fused together, including a region of substantially homogeneous material extending through a region located where the optical fibers are fused together, and a portion of the cladding layer of the optical fibers surrounding the region located where the optical fibers are fused together.

BRIEF DESCRIPTION OF THE DRAWINGS

The foregoing and other objects, aspects and advantages will be better understood from the following detailed description of a preferred embodiment of the invention with reference to the drawings, in which:

FIGS. 5 and 6 are tables comparing the results of a known form of FBT star coupler with the results obtained by virtue of the present invention.

DETAILED DESCRIPTION OF A PREFERRED EMBODIMENT OF THE INVENTION

Figure 1:
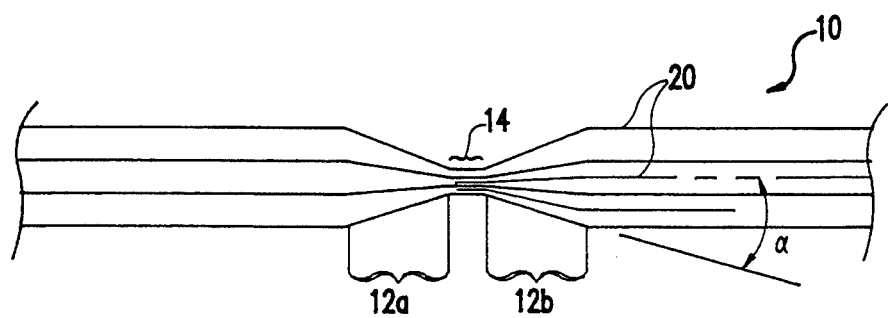
FIG. 1 is a side view of a fused biconical tapered coupler.

Referring now to the drawings, and more particularly to FIG. 1, there is shown a side view of a fused biconical tapered (FBT) star coupler 10. It is to be understood that the gross physical appearance of the FBT coupler in accordance with the invention is substantially similar to conventional FBT couplers; the difference being most readily evident in dopant distribution defining the core and cladding in the individual fibers thereof which will be discussed in detail with reference to FIGS. 2A and 2B.

Figure 2A:
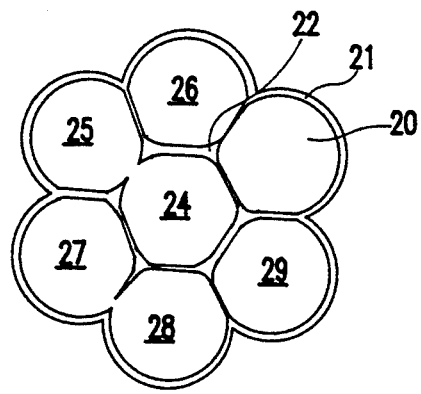
FIG. 2A is an enlarged cross-sectional view of a fused biconical tapered coupler of FIG. 1, at section 2—2 thereof as produced by conventional techniques.
Figure 2C:
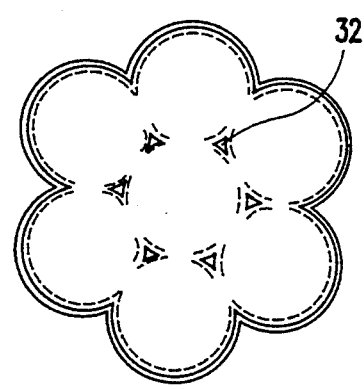
FIG. 2C is an enlarged cross-sectional view of a fused biconical tapered coupler of FIG. 1, at section 2—2 thereof as produced by the invention.

An FBT star coupler, as presently known in the art includes a plurality of fibers 20 (often eight for simplicity in binary addressing but shown as seven in FIGS. 2A and 2C for clarity of illustration and simplicity of explanation of the invention) in as closely nested array as is possible around one or more centrally located fibers. Each fiber preferably includes a cladding layer 21, shown in FIG. 2A, which is of lower refractive index than the central portion of the fiber. Thus, light traveling at a small angle to the axis of the fiber is bent back toward the axis to reduce the angle of incidence of any light reaching the periphery of the fiber to thus achieve nearly complete avoidance of energy loss, referred to as total internal reflection (TIR). This cladding may be a layer of material applied to the fiber but is more often achieved by doping of the core portion of the fiber volume with, for example, germanium oxide ($GeO_2$) by any of a plurality of known techniques, such as chemical vapor deposition (CVD) to raise the relative refractive index of the core. Fluorine is sometimes additionally used as a dopant in the cladding to lower the refractive index thereof.

Figures 3, 4:
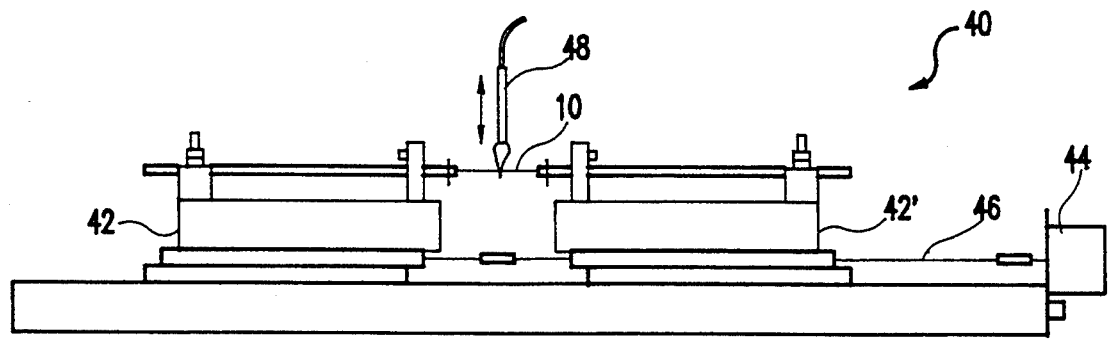
FIG. 3 is a side view of a manufacturing jig for production of the optical coupler of FIG. 1.
FIG. 4 is a tabular illustration of an example of the improvement of coupling uniformity of a biconical coupler during heat treatment at 1350° C. in accordance with the invention.

FIG. 3 illustrates an exemplary apparatus 40 on which a fused biconical tapered star coupler may be made. In the formation of a star coupler by known techniques, the bundle of fibers 10 is inserted into a jig between two movable gripping members 42, 42'. Movement in opposing directions by equal amounts is provided by motor 44 and drive train 46. A small region of the fiber bundle is heated to a temperature just below that at which viscous flow occurs (about 1700° C. for glass) by a gas torch 48 in order to fuse the fibers together at the points of mutual contact. Temperature is readily established by the torch fuel used and the portion of the flame brought into contact with the fiber bundle. Due to the low thermal mass of the heated region of the fibers, achievement of the temperature of the flame is almost instantaneous.

Then, as the heated fiber bundle is stretched by the gripping members 42, 42' and twisted, as described above, the periphery of each fiber becomes angled to the axis of each respective fiber in the conical portions 12a, 12b of the FBT coupler and the axes of the outer fibers become angled ($a$) toward each other and the central fiber or fibers. During this stretching process, the cladding also becomes thinner, reaching a minimum in the short, often generally cylindrical region 14 between the apices of the conical sections 12a, 12b. (The thinning of the cladding may also be augmented by etching prior to bundling of the fibers.)

The FBT star coupler thus functions, in theory, through a plurality of mechanisms. The inward turning of the individual fiber axes guides light conducted generally axially in any fiber along a path which will intersect (in region 14) with the axes or at least the fiber core (in conical regions 12a and 12b) of other fibers at an angle which is sufficiently slight for propagation through other fibers. The reduced thickness of the cladding makes each fiber somewhat more lossy as region 14 is approached. Thus, as the region of maximum lossiness of each fiber is approached the losses from each fiber are increased while the ability of each fiber to receive illumination from other fibers increases and a small portion of a signal in one fiber is communicated to and conducted away from the coupler by all fibers in the coupler.

In practice, however, as indicated above, the magnitude of the signal received by each fiber may vary widely in the conventional star coupler. For example, due to inefficiency of coupling to other fibers the signal strength will usually be substantially greater in the same (output) fiber which carries the input signal (e.g. the so-called throughput fiber) than in other fibers to which the signal is to be coupled. The variation in signal strength in other fibers to which the signal is coupled may also vary widely. Typical output signal strength values for a conventional 8×8 star coupler are shown in FIG. 5; values in the diagonal line indicating greater signal strength in each fiber when that fiber is the throughput fiber. In this case, the ratio of the difference between maximum and minimum output powers to the maximum output power for all ports is 3.3 dB. In contrast, an ideal coupler would provide uniform signal strength in all output fibers. It is also generally recognized in the art that the degree of difference between maximum and minimum signal coupling increases with the number of fibers in the bundle.

It is believed that the significant differences in coupling efficiency between the individual fibers of the star coupler is caused by the lack of control of distribution of the material which constitutes the cladding of each fiber as the star coupler is formed. Assuming plastic deformation of the fibers at the points of mutual contact in the bundle, it would be ideally assumed that a portion of the volume of cladding material would be pushed into the interstices 22 between the fibers in a relatively regular pattern as the fibers are fused together. However, during the stretching of the fiber bundle to form the star coupler, the outer fibers are elongated more than the central fiber and, depending on the degree of twisting, tension may occur at the points of fusion between the fibers. Further, depending on the cladding thickness, the volume of cladding material at these points of fusion may be somewhat greater than can be accommodated in the interstices between the fibers. Thus, the distribution of cladding material may be substantially irregular, as shown in FIG. 2A, and thus may account for wide variation in coupling efficiencies between fibers.

Figure 2B:
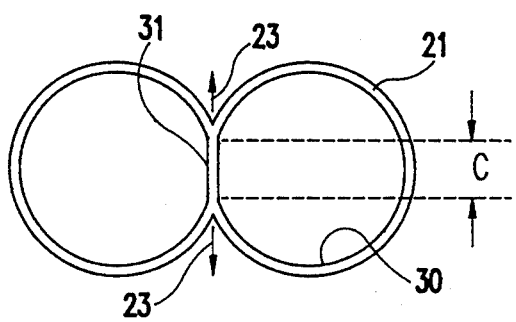
FIG. 2B is an enlarged and idealized view of two fibers of FIG. 2A.

More specifically, with reference to FIG. 2B, illustrating an enlarged and somewhat idealized view of the fusing of two fibers of the coupler bundle of FIG. 2A (or the structure of a two-fiber splitter), it is seen that as the fibers are fused (and assuming some degree of compression therebetween from the twisting operation), some of the cladding material may be pushed out from between the fibers as indicated by arrows 23, causing thinning of the cladding remaining between the fibers in addition to the thinning due to stretching of the fibers. Since the degree of light guiding by the cladding depends on the thickness thereof, the reduction of cladding thickness shown in FIG. 2B would allow a potentially acceptable degree of coupling of light between the fibers over a width C. However, irregularity of the distribution of cladding material, as shown in FIG. 2A will cause a wide variation in dimension C as well as variation in thickness of remaining cladding material.

For example, in FIG. 2A, the cladding material is essentially removed over a significant width between fibers 24 and 25, the remaining cladding between fibers 25 and 26, fibers 24 and 27 and fibers 24 and 26 is similar to that shown in FIG. 2B but with differing (respectively increasing) thickness which will yield different degrees of coupling between these respective pairs of fibers. Between fibers 27 and 28, the distribution of cladding material varies, leaving a small window with no cladding material but including a "wedge" of cladding material which becomes thick. In this case, coupling would be unpredictable and may vary with the mode of light transmission within either of fibers 27 and 28. As shown the thickness of cladding material remaining between fiber 24 and each of fibers 26 and 29 is great enough that little, if any, coupling would occur. Thus, if FIG. 2A were considered to be an accurate representation of a manufactured star coupler, it would probably be considered to be defective and some remedial post-production process, such as the fracture/rotation/refusing operation described above would be required to avoid loss to the manufacturing yield.

In contrast, the invention provides for avoidance of this irregularity in distribution of cladding material. Specifically, it has been found by the inventors that the distribution of the dopants in the cladding and core of the fiber and hence the optical properties of the fiber can be beneficially altered by controlled diffusion of the dopants within the optical fibers of the bundle by heat treatment of the coupler after it is formed.

While dopant diffusion by heat treatment is known and well-understood in semiconductor devices for controlling conductivity, dopant diffusion in optical fibers is considered contrary to usual practice since the presence of impurities in the cladding region is commonly associated with brittleness and loss of structural strength of the fibers. Further, diffusion of dopants from the core into the cladding region would also result in a graded index of refraction both in the cladding and both axially and across the core, possibly resulting in unpredictable optical performance of fibers.

However, in FBT star couplers where the cladding thickness is reduced by the formation of the coupler, diffusion of impurities by heat treatment of the region 14 at the apices of conical portions 12a and 12b causes the region to become sufficiently more homogeneous that uniformity of optical coupling is improved. More specifically, with reference to FIG. 2D, in which the original inner boundary 30 of the cladding region 21 is depicted with a dashed line to correspond to the depiction of FIG. 2B, it is seen that the cladding is further reduced in thickness and the cladding material in region 31 is effectively removed by the outward diffusion of core dopant. Dopants in the cladding, such as fluorine, also diffuse outwardly due to the concentration of core dopants and, to some extent, the effects of cladding dopants (tending to reduce the refractive index of the fiber material) are believed to be counteracted by the diffusion of core dopant. It is also seen that the width of "window" C' is effectively increased. Further, in a preferred form of the invention, some cladding remains surrounding the periphery of the pair of fibers to reduce light loss from the coupler and to provide some structural support for the coupler. In a bundle with an increased number of fibers, as shown in FIG. 2C, remaining inclusions of cladding material are confined to relatively small regions 32 corresponding to the locations of interstices between fibers before fusing of the fibers.

These regions are reduced in size more than the reduction in thickness of the original cladding since diffusion occurs from the cores of all surrounding fibers whereas diffusion is unidirectional at the periphery of the bundle. Therefore, since there is at least some thinning of the cladding material which occurs during the formation of the star coupler (or splitter); the cladding material can be effectively removed from between fibers at the locations where they are fused while leaving cladding around the coupler as a whole and only very small inclusions of cladding material within the coupler.

Thus, the interior of the coupler is substantially homogeneous and highly efficient to produce uniform light coupling between fibers. Further, while the dopant distribution across and axially of each fiber is not presently known with precision, it appears that any graded index of refraction so produced may enhance distribution of light throughout the coupler and enhance the uniformity of the coupling effect.

As an example of the efficacy of this invention, the same FBT star coupler yielding the results illustrated in FIG. 5 was subjected to heat treatment at 1350° C. (achieved as described above) for 405 seconds and similarly tested. This amount of heat treatment is sufficient to produce equilibrium diffusion throughout the coupler, including the outer cladding. The results of this heat treatment are shown in FIG. 6, the left-most column of which corresponds to the right-most column of FIG. 4. It can be readily observed that the signal intensity in the throughput fibers is much closer to the signal strength in the fibers to which the signal is coupled. The ratio of the difference between the maximum and minimum output powers the maximum output power for all input ports has now been reduced to 1.80 dB from 3.3 dB in FIG. 5. The uniformity between non-throughput fibers is also increased in comparison with the results shown in FIG. 5.

However, it should be noted that the uniformity of coupling shown in FIG. 6 has been gained at the expense of some overall loss of signal power due to the reaching of equilibrium diffusion. As indicated above, the rate of diffusion of a material though another material as a function of temperature is well-understood in the semiconductor art. The particular example given above produces a degree of dopant diffusion which reaches equilibrium in region 14 of the star coupler and complete homogeneity of material in that region is expected. In such a case, the cladding material is, in effect, totally removed and the coupler becomes somewhat more lossy. It is therefore preferred to limit heat treatment to a lesser time and or temperature than that which will produce equilibrium diffusion. Results of an example of limited heat treatment (325 seconds at 1350° C.) is illustrated in the center column of FIG. 4. In this example, the uniformity achieved was nearly as great as that of equilibrium diffusion. However, lossiness of the coupler was considerably reduced as can be seen by comparison of the signal strengths of respective output fibers.

Figure 7:
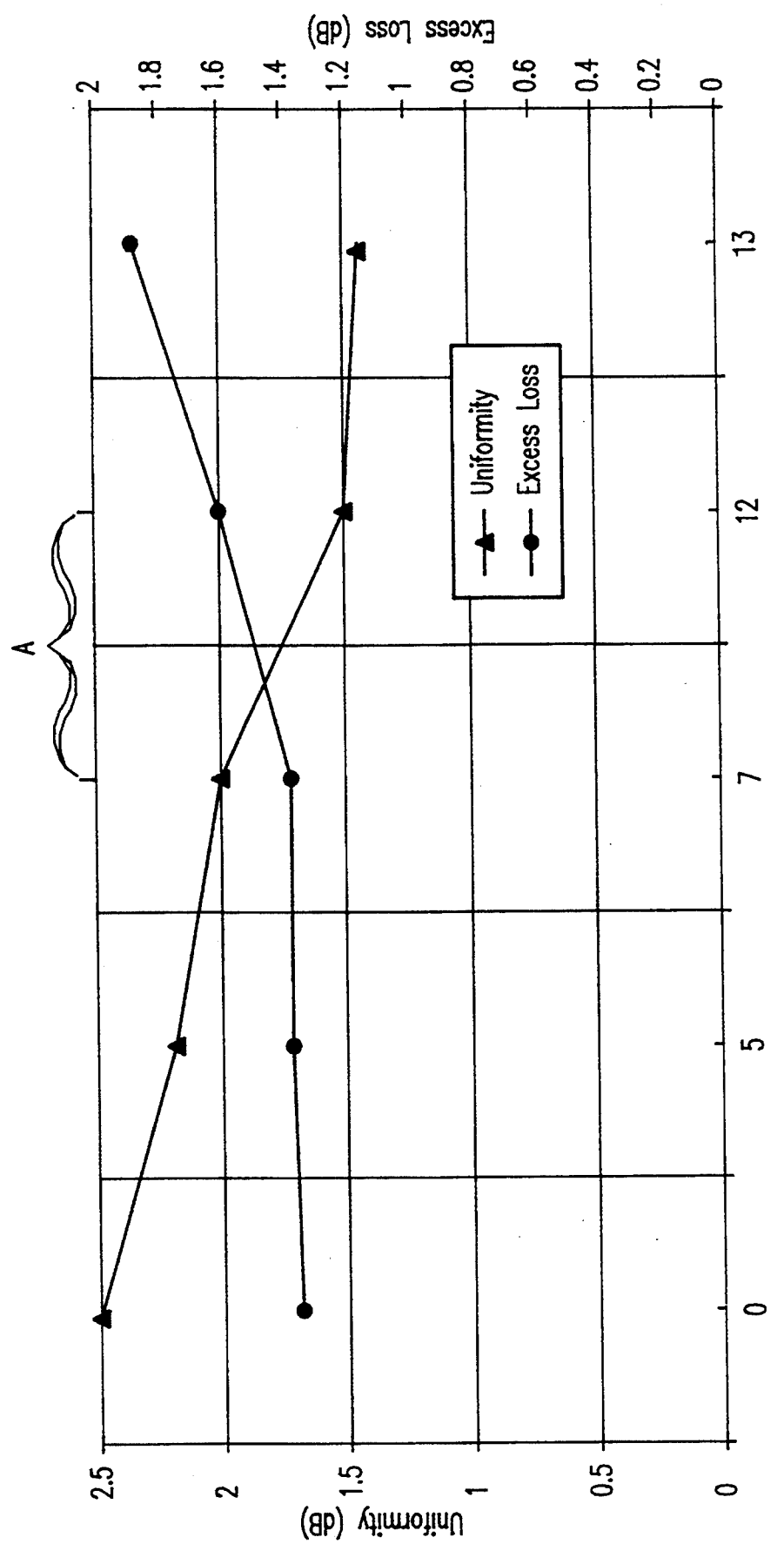
FIG. 7 illustrates results a determination of the optimum degree of heat treatment for coupling uniformity improvement in accordance with the invention.

An exemplary plot (not specific to the example of FIGS. 4–6) of uniformity and lossiness is shown in FIG. 7. As can be seen, uniformity rapidly increases with heat treatment, particularly in the region indicated by bracket A which is believed to correspond to the achievement of substantial homogeneity in the interior of the coupler. Lossiness increases in a generally exponential fashion with heat treatment but the "knee" of the curve (where significant increase in lossiness begins) occurs after a greater degree of heat treatment than that necessary to achieve most of the attainable improvement in uniformity. This result tends to confirm that diffusion of dopant into the cladding material becomes substantially complete in advance of destruction of cladding material at the exterior of the coupler (21' of FIG. 2D).

Specifically and in terms of the structure of the coupler, it is preferred that the duration and temperature of heat treatment be limited such that the diffusion length be less than the projected cladding thickness in region 14 (which can be projected from the length to which the coupler is stretched since the relative proportion of the cladding thickness and core diameter will remain substantially unchanged) so that some thickness of cladding surrounding the coupler region 14 will remain substantially undoped and the graded index of refraction will not reach the boundary of the fiber bundle. In this way, the graded index of refraction will be of the same or greater thickness than the original cladding and the combination of the region of graded index of refraction and the remaining cladding will preserve the property of total internal reflection of the coupler, as a whole.

Figure 2D:
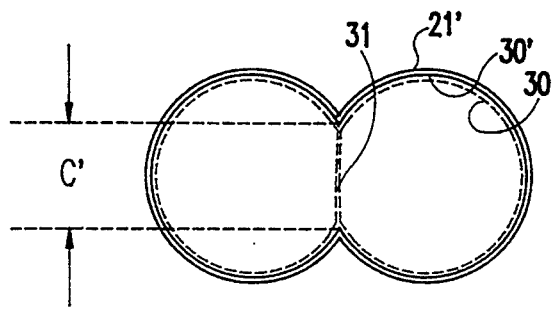
FIG. 2D is an enlarged and idealized view of two fibers of FIG. 2C.

At the same time, the heat treatment should be sufficient to essentially eliminate any change in index of refraction in region 31 of FIG. 2D. In practice, at least two effects may affect the determination of this value. First, some degree of plastic deformation of the cladding material can be anticipated during the formation of the star coupler to reduce the thickness of the cladding material in the fused region. Further, in the fused region, diffusion takes place into the remaining cladding material from at least two directions (e.g. each fiber core contiguous with the cladding material). This further reduces the time required to achieve the desired degree of homogeneity. Thus, a working value of the duration and temperature may be taken as the amount of heat treatment sufficient to produce a diffusion distance of about one-half the projected cladding thickness (projected as indicated above) and further reduced by the proportional thinning of cladding material by plastic deformation thereof into the interstices between unfused fibers which may be projected from the relative geometries thereof. Within these general guidelines, the amount of heat treatment is not particularly critical to the practice of the invention and even small amounts of heat treatment yield significant improvements in signal power uniformity of FBT star couplers.

In this regard, although it is preferable to perform diffusion immediately subsequent to the stretching and twisting operations and without cooling of the coupler (at which point the diffusion of dopant may be most readily and accurately controlled, even though the time required to reach desired diffusion temperatures is not a particularly significant factor in the determination of duration of heat treatment because of the low volume and thermal mass of material in the coupler) all or representative ones of the couplers could be cooled after coupler formation by stretching and twisting and then dimensionally measured or otherwise tested to obtain highly accurate estimates of the cladding material thickness between fibers for determining the amount of heat treatment to be applied.

Incidentally, it is not necessary to reduce the temperature for heat treatment from the temperature used for coupler formation. Diffusion speed increases at increased temperatures and at the temperatures used for coupler formation, a preferred degree of heat treatment would require only a fraction of a minute. Thus, although a lower temperature was used in the foregoing examples to more clearly illustrate how the invention achieves its objectives, a higher temperature would probably be preferred in a production environment.

It is also to be understood that the invention extends to the use of heat treatment to improve performance and/or manufacturing yields of prior art FBT star couplers. Further, since the process in accordance with the invention can be performed over a relatively wide range of amounts of heat treatment, monitoring of manufacture by trained personnel is much less necessary and the manufacturing process can thus be automated; any observed reduction in the number of devices meeting specifications may again be subjected to heat treatment (which may also be automated) in accordance with the invention to reclaim any reduction in manufacturing yield attributable to automation of the manufacturing process.

As an additional and unexpected benefit of the invention, it has also been found that heat treatment in accordance with the invention has not caused the structure to become brittle and subject to breakage. In fact, samples made to date appear to be less subject to breakage than untreated couplers fabricated in accordance with known methods, described above. This increased structural robustness is believed to result from a combination of increased internal homogeneity of the coupler and an effect similar to annealing which reduces the number of internal regions of differing composition (somewhat analogous to increasing grain size in a crystalline material) being greater than weakness engendered from impurity-induced lattice dislocations.

While the invention has been described in terms of a single preferred embodiment, those skilled in the art will recognize that the invention can be practiced with modification within the spirit and scope of the appended claims.

Having thus described my invention, what I claim as new and desire to secure by Letters Patent is as follows:

1. A method for increasing uniformity of optical coupling in an optical element formed from at least two optical fibers, said optical fibers including a cladding layer having a thickness and a core region formed from a material including a dopant which increases the refractive index of said material, said method including the steps of heating a region of said optical element to a temperature at which said dopant will diffuse from said core region into said cladding layer, and maintaining said temperature until at least a region between said at least two optical fibers becomes substantially homogeneous.

2. A method as recited in claim 1, including the further step of terminating said maintaining step prior to diffusing said dopant through said thickness of said cladding material.

3. A method for fabricating an optical element formed from at least two optical fibers, said optical fibers including a cladding layer having a thickness and a core region formed from a material including a dopant which increases the refractive index of said material, said method including the steps of heating a region of said optical element to a temperature at which said dopant will diffuse from said core region into said cladding layer, and maintaining said temperature until at least a region between said at least two optical fibers becomes substantially homogeneous.

4. A method as recited in claim 3, including the further step of terminating said maintaining step prior to diffusing said dopant through said thickness of said cladding material.

5. A method as recited in claim 3, including the further steps of heating a region of said at least two optical fibers to a fusing temperature, stretching said region and twisting said at least two optical fibers, said steps of heating, stretching and twisting being performed prior to said step of maintaining said temperature at which said dopant will diffuse from said core region into said cladding layer.

6. A method as recited in claim 5, wherein said temperature at which said dopant will diffuse into said cladding layer is substantially equal to said fusing temperature.

7. An optical element formed of at least two optical fibers which are fused together, said optical fibers each comprising a core region and a cladding layer, at least one of said core region and said cladding layer being formed from a material including a dopant, said optical element including a region of substantially homogeneous material having a substantially homogeneous diffused dopant distribution extending between and including core regions of said at least two optical fibers through a region located where cladding layers of said at least two optical fibers are fused together, and a portion of said cladding layer surrounding said region located where said at least two optical fibers are fused together.

* * * * *